(12) United States Patent
Itokazu et al.

(10) Patent No.: US 9,707,638 B2
(45) Date of Patent: Jul. 18, 2017

(54) WIRE ELECTRIC-DISCHARGE MACHINING DEVICE, WIRE ELECTRIC-DISCHARGE MACHINING METHOD, THIN-PLATE MANUFACTURING METHOD, AND SEMICONDUCTOR WAFER MANUFACTURING METHOD

(71) Applicants: Atsushi Itokazu, Chiyoda-ku (JP); Hidetaka Miyake, Chiyoda-ku (JP)

(72) Inventors: Atsushi Itokazu, Chiyoda-ku (JP); Hidetaka Miyake, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 427 days.

(21) Appl. No.: 14/364,188

(22) PCT Filed: Dec. 17, 2012

(86) PCT No.: PCT/JP2012/082696
§ 371 (c)(1),
(2) Date: Jun. 10, 2014

(87) PCT Pub. No.: WO2013/108530
PCT Pub. Date: Jul. 25, 2013

(65) Prior Publication Data
US 2014/0332503 A1    Nov. 13, 2014

(30) Foreign Application Priority Data

Jan. 18, 2012 (JP) .................................. 2012-007807

(51) Int. Cl.
*B23H 7/06* (2006.01)
*B23H 7/10* (2006.01)
(Continued)

(52) U.S. Cl.
CPC ................. *B23H 7/06* (2013.01); *B23H 7/10* (2013.01); *B23H 1/028* (2013.01); *B23H 7/02* (2013.01)

(58) Field of Classification Search
CPC . B23H 1/028; B23H 7/02; B23H 7/06; B23H 7/10; B23H 7/14; B23H 7/105
See application file for complete search history.

(56) References Cited

U.S. PATENT DOCUMENTS

| 4,438,312 A * | 3/1984 | Inoue ....................... B23H 7/10 219/69.12 |
| 2012/0312787 A1 | 12/2012 | Nakagawa et al. |
| 2013/0140277 A1 | 6/2013 | Itokazu et al. |

FOREIGN PATENT DOCUMENTS

| JP | 32-290 Y1 | 1/1957 |
| JP | 32-1992 Y1 | 3/1957 |

(Continued)

OTHER PUBLICATIONS

Combined Chinese Office Action and Search Report issued Aug. 5, 2015 in Patent Application No. 201280067416.4 (with partial English language translation and English translation of categories of cited documents).

(Continued)

*Primary Examiner* — Christopher Kim
(74) *Attorney, Agent, or Firm* — Oblon, McClelland, Maier & Neustadt, L.L.P.

(57) ABSTRACT

A wire electric-discharge machining device includes a control unit that selects a cutting wire to which a pulse voltage is applied by a pulse-voltage generation unit on a basis of an angle formed between an end face of a workpiece and a plane including a plurality of cutting wires, which are not parallel to the end face, an interval between parallel cutting wires, and a relative distance between the cutting wires and the workpiece. A drive unit drives a workpiece in a direction (Continued)

not vertical to the plane including the cutting wires, and the workpiece is cut by electric-discharge machining by applying a pulse voltage.

5 Claims, 8 Drawing Sheets

(51) Int. Cl.
    *B23H 7/02*     (2006.01)
    *B23H 1/02*     (2006.01)

(56) References Cited

FOREIGN PATENT DOCUMENTS

| JP | 2000-094221 A | 4/2000 |
| JP | 2009-166211 A | 7/2009 |
| JP | 2009-226504 A | 10/2009 |
| JP | 2011-062764 A | 3/2011 |
| WO | 2013/073225 A1 | 5/2013 |

OTHER PUBLICATIONS

International Search Report issued Mar. 19, 2013, in PCT/JP2012/082696 filed Dec. 17, 2012.

\* cited by examiner

WIRE ELECTRIC-DISCHARGE MACHINING DEVICE, WIRE ELECTRIC-DISCHARGE MACHINING METHOD, THIN-PLATE MANUFACTURING METHOD, AND SEMICONDUCTOR WAFER MANUFACTURING METHOD

FIELD

The present invention relates to a wire electric-discharge machining device, a wire electric-discharge machining method, a thin-plate manufacturing method, and a semiconductor wafer manufacturing method, and more particularly to a wire electric-discharge machining device, a wire electric-discharge machining method, a thin-plate manufacturing method, and a semiconductor wafer manufacturing method, where a pulse voltage is applied between a workpiece and a cutting wire part including a plurality of cutting wires formed by winding one wire electrode around a plurality of guide rollers arranged with an interval therebetween, so as to cut the workpiece into a plurality of pieces by electric discharge.

BACKGROUND

There has been disclosed a technique of forming a plurality of cutting wire parts with respect to a columnar workpiece by winding one wire electrode around a plurality of guide rollers and applying a pulse voltage between the cutting wire parts and the columnar workpiece to generate electric discharge, thereby collectively cutting out a plurality of thin plates from the workpiece (see, for example, Patent Literature 1 and Patent Literature 3).

According to this method, a plurality of power feeding parts are provided in one wire electrode, a pulse voltage is applied between the workpiece and the cutting wire parts simultaneously to generate electric discharge, and a plurality of thin plates are collectively cut out from the workpiece. In thin-plate machining according to this method, there may be a demand for narrowing the extension pitch of the cutting wire parts to decrease the thickness of the thin plates to be cut out. With respect to this demand, in Patent Literature 3, each of power feeding parts that feeds power to a cutting wire part is shifted and arranged in an extending direction of a cutting wire, so as to realize thinning of the thin plate.

According to these methods, as described above, a pulse voltage is simultaneously applied between a workpiece and cutting wire parts to generate electric discharge, thereby collectively cutting out a plurality of thin plates from the workpiece. Therefore, a current for machining flows from an adjacent power feeding part to the cutting wire part in which electric discharge has occurred, thereby causing disconnection of a wire electrode or a decrease in machining surface accuracy.

With respect to this problem, Patent Literature 2 proposes a method of shifting an application timing of a pulse voltage to an adjacent cutting wire part. According to this method, by shifting the application timing of the pulse voltage to cutting wire parts to increase impedance between the cutting wire parts during application of the pulse voltage, it is possible to prevent a machining current from flowing from the cutting wire parts during application of a voltage and to stabilize electric discharge.

CITATION LIST

Patent Literatures

Patent Literature 1: Japanese Patent Application Laid-open No. 2000-94221

Patent Literature 2: Japanese Patent Application Laid-open No. 2011-62764

Patent Literature 3: Japanese Patent Application Laid-open No. 2009-166221

SUMMARY

Technical Problem

According to the method disclosed in Patent Literature 3, the thickness of each of power feeding parts needs to be decreased as the extension pitch of the cutting wires is narrowed. However, there is a limitation in thinning of each of the power feeding parts, and it is generally difficult to machine a thin plate having a thickness of several hundred micrometers or less in a cutting process. This is because a power feeder extracted from a machining power source is connected to a conductor part of a power feed contact by soldering or the like, and the power feeder needs to have a certain thickness because a machining current flows thereto, and thus a portion that connects the power feeder and the conductor part of the power feed contact needs to have a certain thickness.

On the other hand, in actual electric discharge, a workpiece and a facing plane of a cutting wire part are not always parallel according to the setup arrangements. Furthermore, according to the shape of the workpiece, machining may be required when the workpiece and the facing plane of the cutting wire part are not parallel. In such machining, electric discharge occurs from one cutting wire part, and as the machining progresses, electric discharge occurs from all the cutting wire parts.

In a conventional wire electric-discharge machining device, in a case of machining in which an end face of a workpiece is inclined with respect to a parallel direction of cutting wire parts, because an electric-discharge machining pulse voltage is applied simultaneously to the these cutting wire parts, in end face machining, a machining current flows from a cutting wire part in which electric discharge has not occurred. Therefore, electric discharge is unstable and thus there are problems such as disconnection of a wire electrode and a decrease in machining surface accuracy.

The present invention has been achieved to solve the above problems, and an object of the present invention is to provide a wire electric-discharge machining device, a wire electric-discharge machining method, a thin-plate manufacturing method, and a semiconductor wafer manufacturing method, where the wire electric-discharge machining device having a method of machining a workpiece into thin plates having a thickness of several hundred micrometers or less, in wire electric-discharge machining in which a cutting wire part including a plurality of cutting wires is formed with respect to the workpiece by winding one wire electrode around a plurality of guide rollers and a pulse voltage is applied between the cutting wire part and the workpiece to generate electric discharge, thereby collectively cutting out a plurality of thin plates from the workpiece, and the wire electric-discharge machining device preventing disconnection of a wire electrode and a decrease in machining surface accuracy caused by a machining current flowing in from a cutting wire part in which electric discharge has not occurred in end face machining. That is, an object of the present invention is to provide, in semiconductor-wafer machining and thin-plate machining, a wire electric-discharge machining device that can cut a workpiece with a narrow pitch and can perform stable electric discharge machining with respect to an end face of a workpiece, when a plane including cutting wire part and an end face of the workpiece are not parallel to each other.

Solution to Problem

In order to solve the above problems and achieve the object, according to a first aspect of the present invention, a wire electric-discharge machining device includes a cutting wire part including a plurality of cutting wires that are arranged parallel to each other so as to face a workpiece by winding a wire electrode around a plurality of guide rollers; a drive unit that controls a relative distance between the workpiece and the cutting wire part; and a plurality of pulse-voltage generation units that independently apply a pulse voltage between the workpiece and the cutting wires, wherein the drive unit arranges the workpiece with an inclination angle with respect to a plane including the cutting wires and controls a relative distance between the cutting wires and the workpiece.

According to a second aspect of the present invention, in addition to the configuration of the invention of the first aspect, the pulse-voltage generation units select a cutting wire to which a pulse voltage is applied on the basis of the inclination angle between the plane including the cutting wires and an end face of the workpiece, an extension pitch of the cutting wire, and the relative distance.

Advantageous Effects of Invention

According to the first aspect of the present invention, in wire electric-discharge machining in which a cutting wire part including a plurality of cutting wires is formed for a workpiece by winding one wire electrode around a plurality of guide rollers and a pulse voltage is applied between the cutting wire part and the workpiece to generate electric discharge, thereby collectively cutting out a plurality of thin plates from the workpiece, an effect is obtained where the workpiece can be machined into thin plates having a thickness of several hundred micrometers or less, without narrowing an extension pitch of the cutting wires.

Furthermore, according to the second aspect of the present invention, in a wire electric-discharge machining device in which a cutting wire part including a plurality of cutting wires is formed for a workpiece by winding one wire electrode around a plurality of guide rollers and a pulse voltage is applied between the cutting wire part and the workpiece to generate electric discharge, thereby collectively cutting out a plurality of thin plates from the workpiece, an effect is obtained where electric discharge on an end face of the workpiece can be stably maintained, and disconnection of the wire electrode and a decrease in machining surface accuracy can be suppressed.

DESCRIPTION OF EMBODIMENTS

Exemplary embodiments of a wire electric-discharge machining device according to the present invention will be explained below in detail with reference to the accompanying drawings. The present invention is not limited to the embodiments.

First Embodiment

Figure 1:
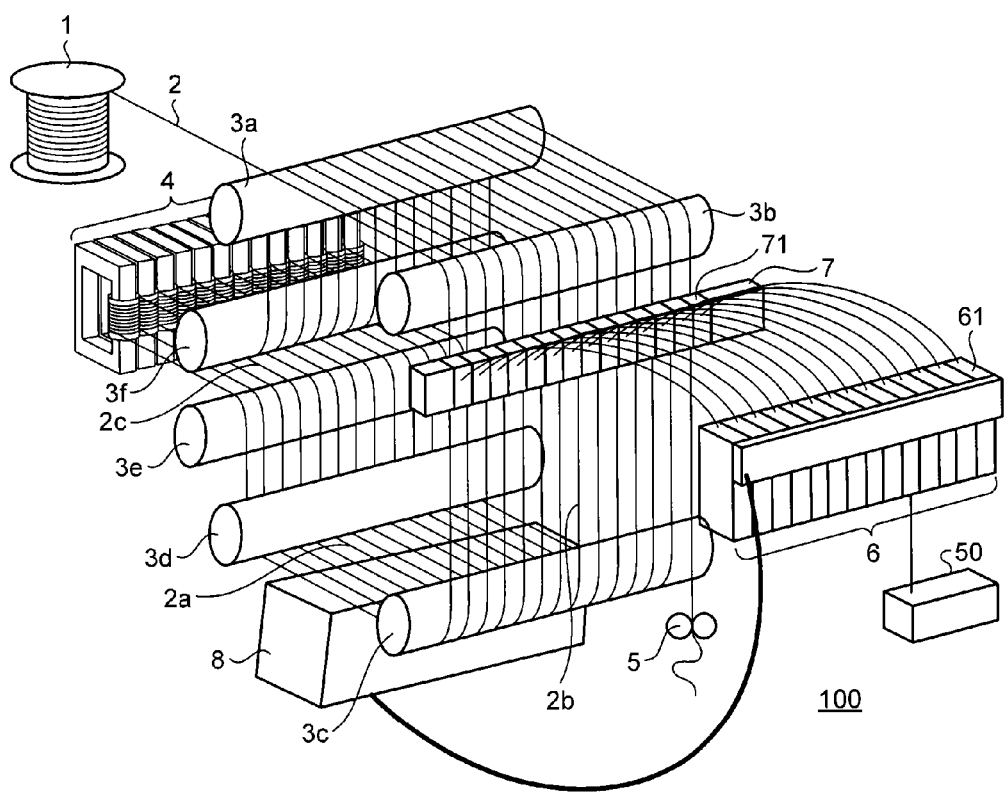
FIG. 1 is a perspective view of a schematic configuration of a wire electric-discharge machining device according to a first embodiment of the present invention.

FIG. 1 is a perspective view of a schematic configuration of a wire electric-discharge machining device 100 according to a first embodiment of the present invention. In FIG. 1, the wire electric-discharge machining device 100 includes a wire bobbin 1 that reels out a wire electrode 2, a first guide roller 3a, a second guide roller 3b, a third guide roller 3c, a fourth guide roller 3d, a fifth guide roller 3e, a sixth guide roller 3f, and a collecting roller 5 that collects the wire electrode 2. One wire electrode 2 is sequentially wound around the first to sixth guide rollers 3a to 3f, and the wire electrodes 2 are arranged in parallel in the axial direction. At the time of performing wire electric-discharge machining, the wire electrode 2 runs from the wire bobbin 1 to the collecting roller 5 through such a route.

A cutting wire part 2a formed of the wire electrodes 2 laid parallel to each other is formed between the third guide roller 3c and the fourth guide roller 3d of the wire electrode 2. A workpiece 8 facing the cutting wire part 2a is transferred in a cutting direction while being controlled to have an appropriate interelectrode distance by a position control device (not shown). A machining fluid is supplied between the workpiece 8 and the cutting wire part 2a by spraying or immersion in the same manner as that of a general wire electric-discharge machining device.

Power feed contact units 71 respectively come in contact with a plurality of wire electrodes 2 laid parallel to each other between the second guide roller 3b and the third guide roller 3c of the wire electrode 2, and this part becomes a power-feed-contact wire part 2b. The power feed contact units 71 are respectively connected to machining power source units 61 to apply a pulse voltage to the respective cutting wires constituting the cutting wire part 2a via the power-feed-contact wire part 2b. The respective power feed contact units 71, which are insulated from each other, are integrated to form a power feed contact 7.

The respective machining power source units 61 can apply a voltage to the cutting wires of the cutting wire part 2*a* respectively independently via the respective power feed contact units 71, and a ground thereof is communalized and connected to the workpiece 8. The respective machining power source units 61 constitute a machining power source 6 as a whole. In response to a command from a machining control device 50 (control unit), the machining power source 6 can generate electric discharge by applying a pulse voltage independently between the workpiece 8 and the cutting wire part 2*a* that are away from each other by a minute distance. The polarity of the pulse voltage applied by the machining power source 6 can be appropriately reversed as required.

A wire part 2*c* of the wire electrode 2 between the fifth guide roller 3*e* and the sixth guide roller 3*f* can be wound around a high-frequency insulating device 4 for plural times, thereby enabling high frequency insulation of the respective cutting wires of the cutting wire part 2*a*. Because a high frequency voltage needs to be applied to the respective cutting wires of the cutting wire part 2*a* independently from the respective machining power source units 61, the power feed contact 7 is arranged between the high-frequency insulating device 4 and the respective cutting fires of the cutting wire part 2*a*.

As the workpiece 8, an ingot workpiece to be sliced into a plurality of thin plates can be used. As the material thereof, there can be mentioned metal such as tungsten and molybdenum, for example, which become a sputtering target, ceramics such as polycrystalline silicon carbide used as various structural members, semiconductor materials such as monocrystalline silicon and monocrystalline silicon carbide, which become semiconductor device wafers, and solar cell materials such as monocrystalline silicon and polycrystalline silicon, which become solar cell wafers.

Among the materials mentioned above, metal has a sufficiently low specific resistance, and there is no problem in application of electric-discharge machining. However, among the semiconductor materials and the solar cell materials, a material having a specific resistance of about 100 $\Omega$cm or less, preferably 10 $\Omega$m or less, can be subjected to electric-discharge machining.

Accordingly, as the workpiece 8, metal or a material having a specific resistance equal to that of metal or having a specific resistance of 100 $\Omega$cm or less, preferably 10 $\Omega$cm or less, and particularly, the semiconductor material or the solar cell material having the specific resistance within the range mentioned above is preferable.

Figure 8:
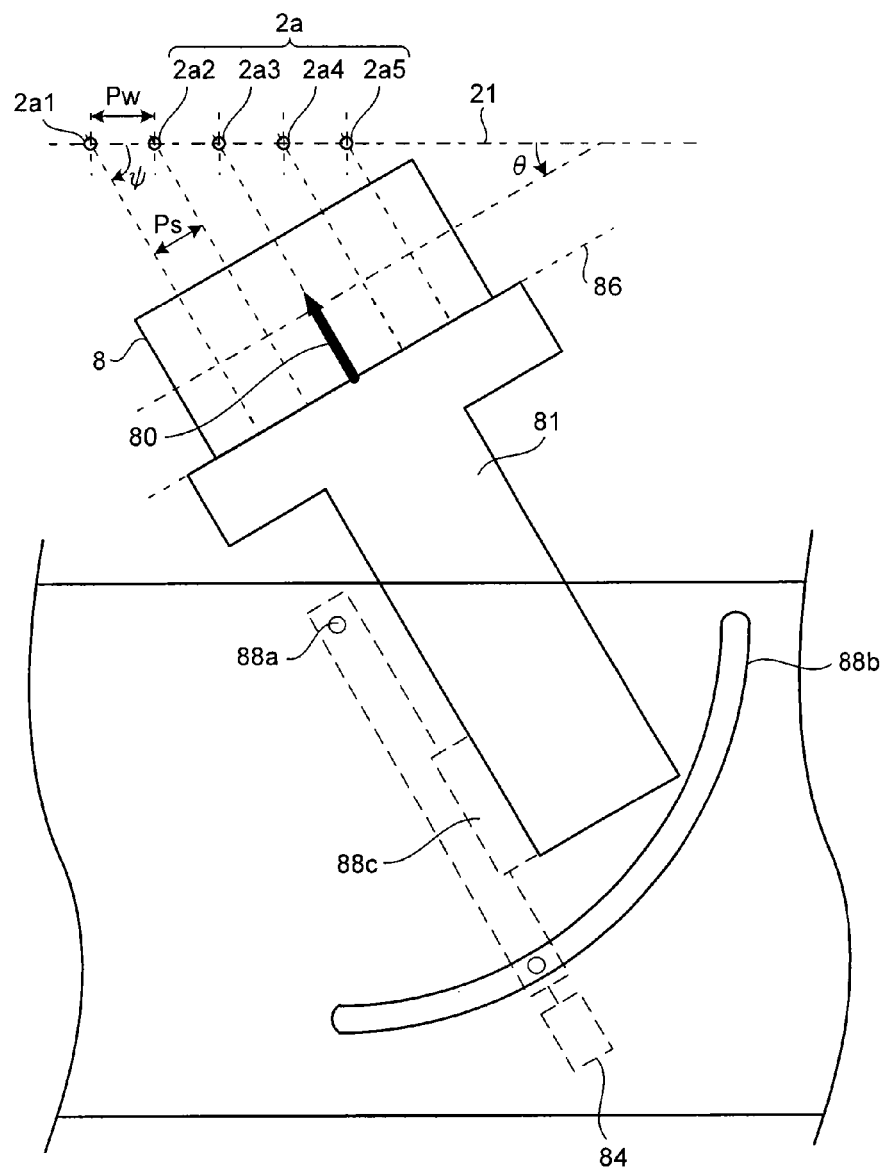
FIG. 8 is a plan view of the cutting wire part and a drive unit as viewed from the extension direction of the cutting wire part of the wire electric-discharge machining device according to the first embodiment of the present invention.

A drive unit that controls a relative distance between the workpiece and the cutting wire part are explained next. FIG. 8 is a plan view of the cutting wire part 2*a* and the drive unit as viewed from an extension direction of the cutting wire part 2*a*. The workpiece 8 is fixed to a workpiece moving stage 81, and the workpiece moving stage 81 is connected to a machining-direction changing unit 88*c*. The machining-direction changing unit 88*c* can change a moving direction of the workpiece moving stage 81 (that is, a machining direction). For example, the advancing direction of the workpiece moving stage 81 can be changed by changing an inclination of the machining-direction changing unit 8B*c*, using a machining-direction setting center 88*a* as a center of rotation and a machining-direction setting guide 88*b* as a guide. The workpiece moving stage is driven by a drive actuator 84 attached to the machining-direction changing unit 88*c*, to move in the machining direction set by the machining-direction changing unit 88*c*.

Machining grooves can be formed on the workpiece with a smaller pitch than an extension pitch Pw of the wire by transferring the workpiece in a direction that is not vertical to a plane 21 including a plurality of cutting wires. As it is assumed that an angle formed between the plane 21 including the cutting wires and a moving direction 80 of the workpiece as viewed from the extension direction of the cutting wire part 2*a* is $\psi$, a relational expression of $$Ps = Pw \cdot \sin \psi \qquad \text{(Expression 1)}$$

is established between a pitch Ps of the machining grooves formed on the workpiece 8 by the cutting wire part 2*a* and the extension pitch Pw of the cutting wires, and needless to mention, Ps≤Pw is established.

In FIG. 1, an example in which one wire electrode 2 is wound around the six guide rollers 3*a* to 3*f* is shown. However, the present embodiment is not limited to this example, and a specific method is not particularly limited as long as the wire electrode 2 is wound around a plurality of guide rollers to form the cutting wire part 2*a* configured by the cutting wires.

In FIG. 8, an example of using one actuator as the drive unit of the workpiece moving stage is shown. However, a plurality of actuators can be used as long as the actuator drives the workpiece 8 in a direction that is not vertical to the plane including the cutting wires, and a specific method thereof is not particularly limited.

Figure 9:
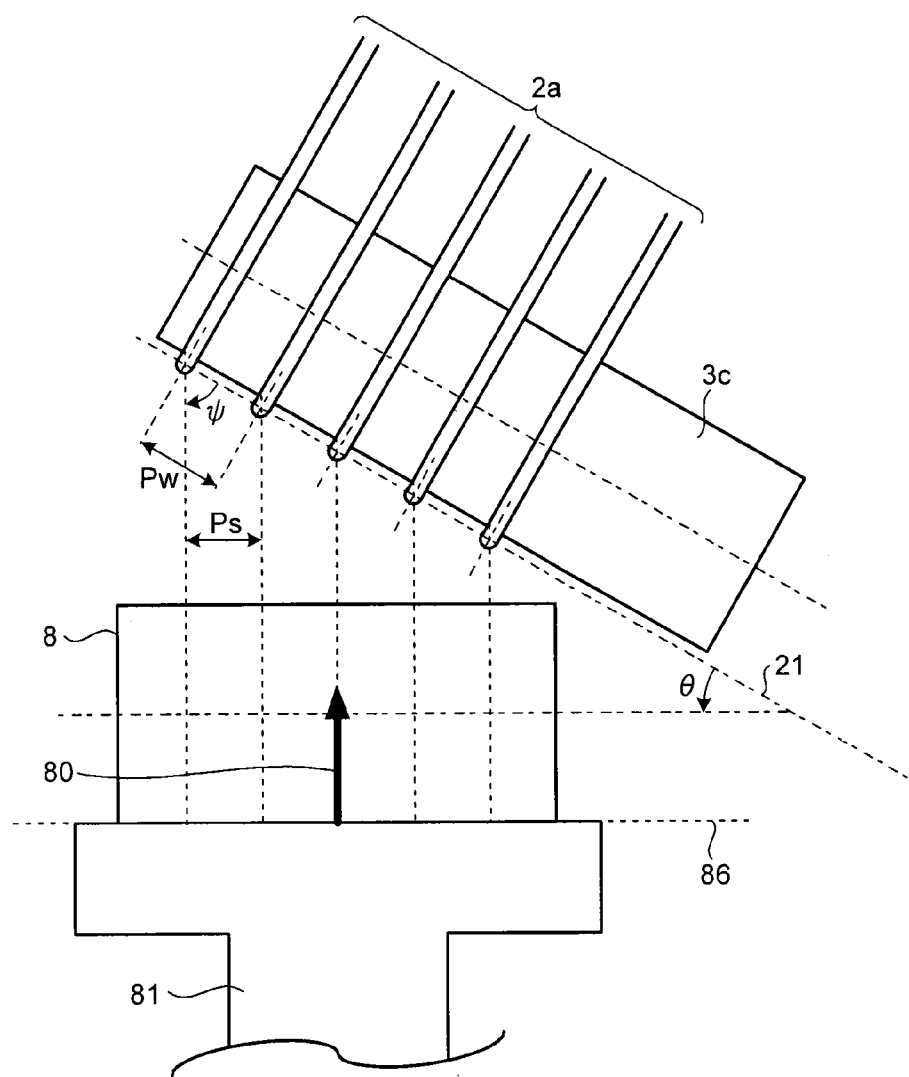
FIG. 9 is a plan view of the cutting wire part and the drive unit as viewed from the extension direction of the cutting wire part of the wire electric-discharge machining device according to the first embodiment of the present invention.

Furthermore, in the example shown in FIG. 8, cutting is performed with a machining groove pitch smaller than the extension pitch Pw by changing the moving direction of the workpiece moving stage with respect to the cutting wire part 2*a*. However, when the plane 21 including a plurality of cutting wire parts as viewed from the extension direction of the cutting wire part 2*a* has an inclination of an acute angle, as shown in FIG. 9, the first to sixth guide rollers 3*a* to 3*f* can be arranged such that the plane 21 including the cutting wire parts have the inclination of an acute angle with respect to the moving direction of the workpiece moving stage, and the specific method thereof is not particularly limited.

As described above, by arranging the workpiece with the inclination angle between the cutting wire part and the workpiece, and controlling the relative distance between the cutting wires and the workpiece, the pitch of a groove width after machining can be made narrower than the pitch of the power feed contact units 71. That is, thinning of slices and a slicing yield can be improved.

Second Embodiment

Figure 2:
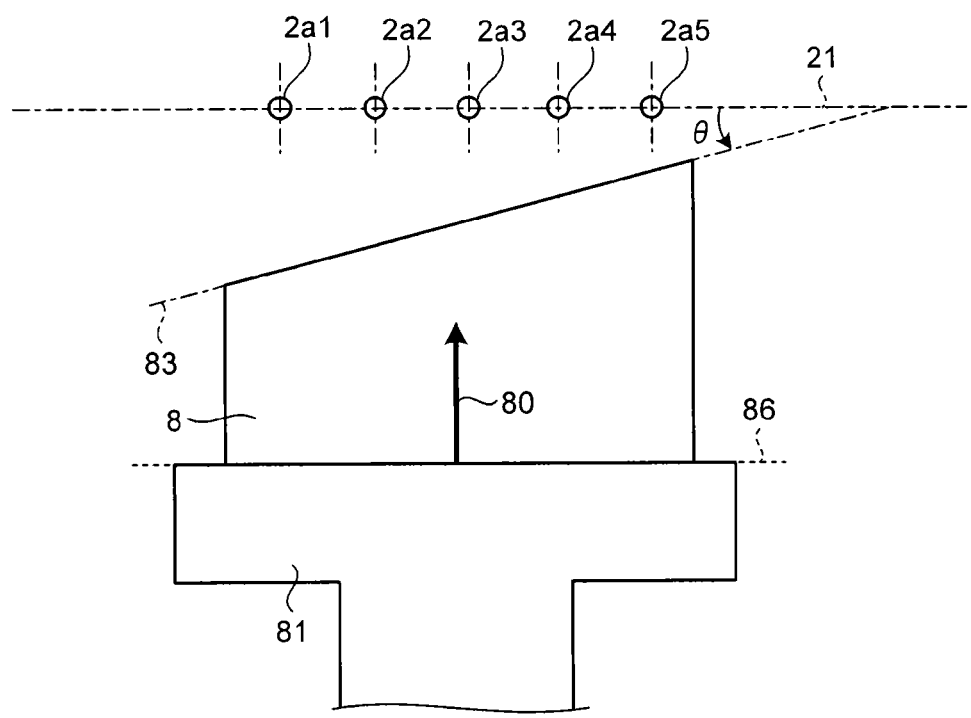
FIG. 2 is a plan view of a cutting wire part of a wire electric-discharge machining device according to a second embodiment of the present invention and a workpiece as viewed from an extension direction of the cutting wire part.

FIG. 2 is a plan view of the cutting wire part 2*a* and the workpiece 8 according to a second embodiment of the present invention as viewed from the extension direction of the cutting wire part 2*a*. The workpiece moving stage 81 has a structure being driven in the moving direction 80. A workpiece fixing surface 86 of the workpiece moving stage 81 is formed so as to be parallel to a parallel direction of the cutting wire part 2*a* including a plurality of cutting wires 2*a*1 to 2*a*5. Other configurations of the second embodiment are identical to those of the first embodiment.

It is assumed here that the workpiece 8 is fixed in a state where an end face 83 of the workpiece 8 is inclined with an angle $\theta$ with respect to an inclination angle of the plane 21 including the cutting wire part 2*a*. The inclination angle of the plane 21 including the cutting wire part 2*a* can be assumed to be, for example, an angle formed by the plane 21 including the cutting wire part 2*a* (a plane including both the extension direction of the cutting wire part 2*a* and the parallel direction of the cutting wires 2*a*1 to 2*a*5) with respect to the workpiece moving stage 81. In this case, the inclination angle θ of the end face 83 of the workpiece 8 with respect to the parallel direction of the cutting wire part 2a can be measured in advance by an operator.

The machining control device 50 can specify the cutting wire 2a5 nearest to the end face of the workpiece 8 on the basis of the inclination angle θ of the end face of the workpiece 8 with respect to the parallel direction of the cutting wire part 2a input by an operator. Reference sign θ denotes an angle formed between the plane 21 including the cutting wire part 2a and the end face 83 of the workpiece 8. The machining control device 50 can memorize the position of the workpiece moving stage 81 at the time of starting electric discharge in the cutting wire 2a5 nearest to the end face of the workpiece 8. The machining control device 50 can calculate the position of the workpiece moving stage 81 where electric discharge will occur in the remaining respective cutting wires 2a1 to 2a4, on the basis of the position of the workpiece moving stage 81 when electric discharge has started in the cutting wire 2a5, the inclination angle θ of the end face of the workpiece 8 with respect to the parallel direction of the cutting wire part 2a, intervals between the parallel cutting wires in the cutting wire part 2a, and the like. The machining control device 50 can select one of the cutting wires 2a1 to 2a4 to which a pulse voltage is applied according to the calculated machining position.

Figure 3:
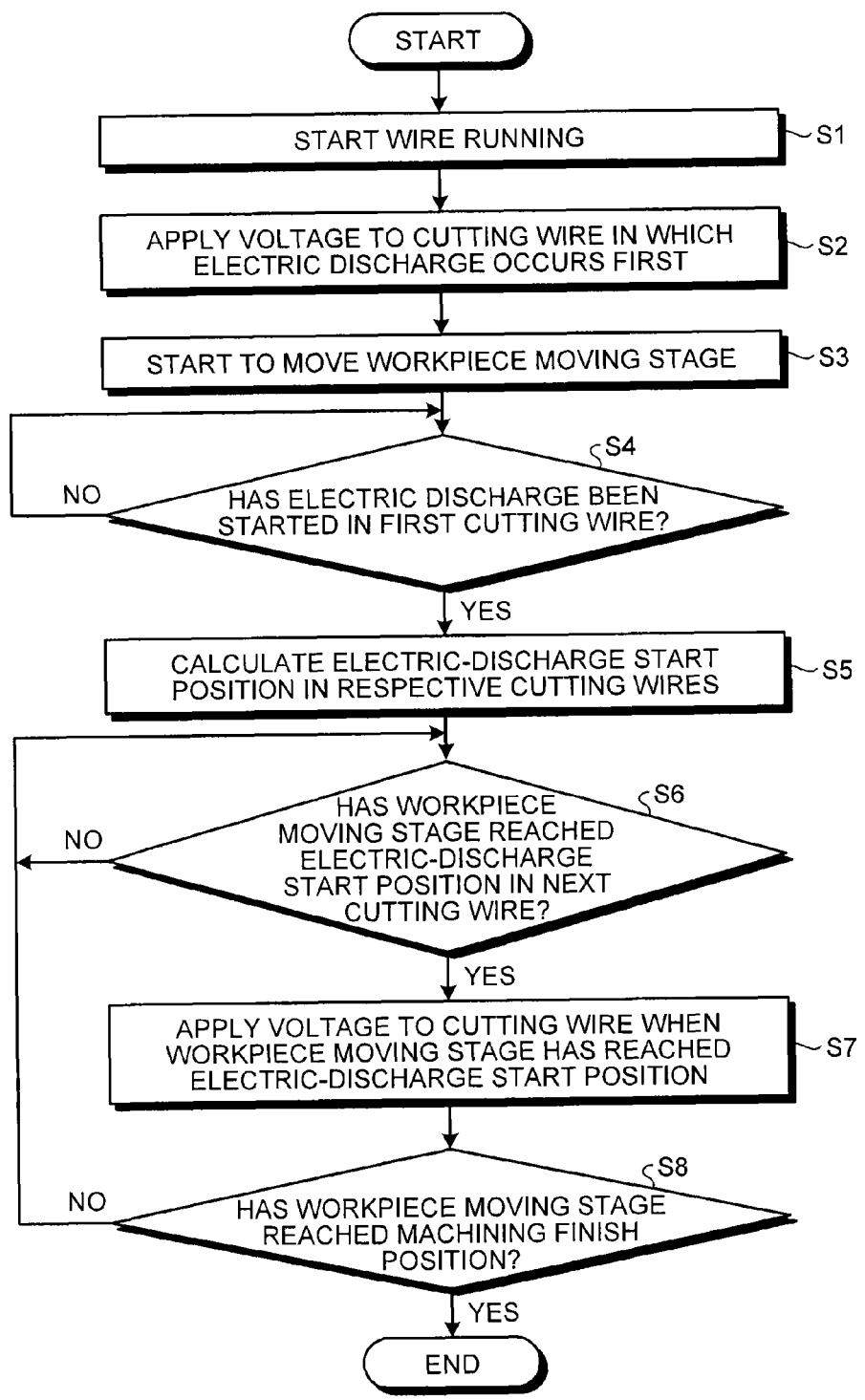
FIG. 3 is a flowchart explaining an operation of a machining control device that is applied to the wire electric-discharge machining device according to the second embodiment of the present invention.

FIG. 3 is a flowchart explaining an operation of the machining control device 50.

First, at Step S1, the wire bobbin 1, the first guide roller 3a, the second guide roller 3b, the third guide roller 3c, the fourth guide roller 3d, the fifth guide roller 3e, the sixth guide roller 3f, and the collecting roller 5 are rotated to cause the wire electrode 2 to run sequentially. Next, at Step S2, a pulse voltage is applied to the cutting wire 2a5 nearest to the end face of the workpiece 8. Subsequently, at Step S3, the workpiece moving stage 81 is moved so as to generate electric discharge in the cutting wire 2a5.

At Step S4, the machining control device 50 then determines whether electric discharge has occurred in the cutting wire 2a5 (YES at Step S4) or (NO at Step S4), and moves the workpiece moving stage 81 until generation of electric discharge is detected. That is, the machining control device 50 decreases the relative distance between the workpiece 8 and the cutting wire part 2a to determine generation of the first electric discharge (start of electric-discharge machining). When having detected generation of electric discharge (YES at Step S4), the machining control device 50 calculates the position where electric discharge will occur in the remaining respective cutting wires 2a1 to 2a4, on the basis of the position of the workpiece moving stage 81 at the time of generation of electric discharge in the cutting wire 2a5, by using the inclination angle θ of the end face of the workpiece 8 with respect to the parallel direction of the cutting wire part 2a and the intervals between the parallel cutting wires in the cutting wire part 2a as described above (Step S5).

At Step S6, the machining control device 50 then determines whether the workpiece moving stage 81 has reached the position where electric discharge occurs in the next cutting wire (YES at Step S6) or (NO at Step S6) on the basis of the position of the workpiece moving stage 81 where electric discharge will occur in the respective cutting wires 2a1 to 2a4 calculated at Step S5. This determination is continued until the workpiece moving stage 81 reaches the position where electric discharge occurs in the next cutting wire (NO at Step S6). When the workpiece moving stage 81 has reached the position where electric discharge occurs in the next cutting wire (YES at Step S6), the machining control device 50 applies a pulse voltage to the cutting wire (Step S7). Further, at Step S8, the machining control device 50 determines whether the workpiece moving stage 81 has reached a machining finish position (YES at Step S8) or (NO at Step S8). When the workpiece moving stage 81 has not reached the machining finish position (NO at Step S8), control returns to Step S6 where the machining control device 50 determines whether the workpiece moving stage 81 has reached the position where electric discharge occurs in the next cutting wire. The machining control device 50 repeats the process until the workpiece moving stage 81 reaches the machining finish position (YES at Step S8). Accordingly, a pulse voltage is sequentially applied to the cutting wires 2a1 to 2a4.

In conventional end face machining of the workpiece 8, a machining current flows in from a cutting wire of the cutting wire part 2a in which electric discharge has not occurred, and thus electric discharge is not stable, and disconnection of the wire electrode 2 may occur or machining surface accuracy may decrease. That is, when there is a cutting wire where electric discharge has not occurred together with a cutting wire where electric discharge is presently generated, and a common pulse voltage is applied to these cutting wires, a pulse voltage (a pulse current) applied to the cutting wire in which electric discharge has not occurred flows into the cutting wire in which electric discharge is presently generated to become an excessive current, thereby causing disconnection of wires, unevenness of machining groove width, or deterioration of surface accuracy. However, according to the present embodiment, because the pulse voltage is selectively applied to each of the cutting wires 2a1 to 2a5, these problems can be prevented and excellent electric-discharge machining can be maintained. That is, electric discharge at the time of the end face machining can be maintained stably, and disconnection of the wire electrode and a decrease in machining surface accuracy can be suppressed.

When the position of the workpiece moving stage 81 where electric-discharge machining is started with respect to the cutting wire 2a5 is known in advance, for example, when the distance between the cutting wire 2a5 at the time of starting to drive the workpiece moving stage 81 and the portion of the end face of the workpiece 8 to be machined by the cutting wire 2a5 is known, Steps S2 to S4 can be omitted and selective pulse application is also possible to the cutting wire 2a5.

Third Embodiment

Figure 4:
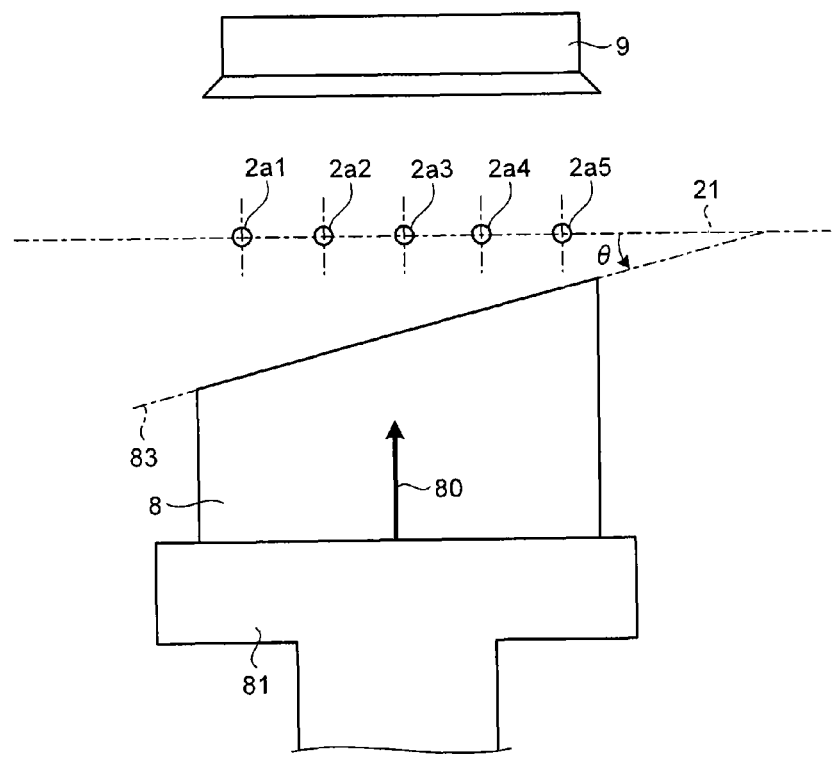
FIG. 4 is a plan view of a cutting wire part of a wire electric-discharge machining device according to a third embodiment of the present invention and a workpiece as viewed from an extension direction of the cutting wire part.

FIG. 4 is a plan view of the cutting wire part 2a of the wire electric-discharge machining device 100 according to a third embodiment of the present invention and the workpiece 8 as viewed from the extension direction of the cutting wire part 2a. The wire electric-discharge machining device 100 according to the present embodiment includes an angle measurement unit 9 that measures the inclination angle of the end face of the workpiece 8 with respect to the parallel direction of the cutting wire part 2a including the cutting wires 2a1 to 2a5. As the angle measurement unit 9, a non-contact measurement unit such as a laser displacement meter can be used.

Figure 5:
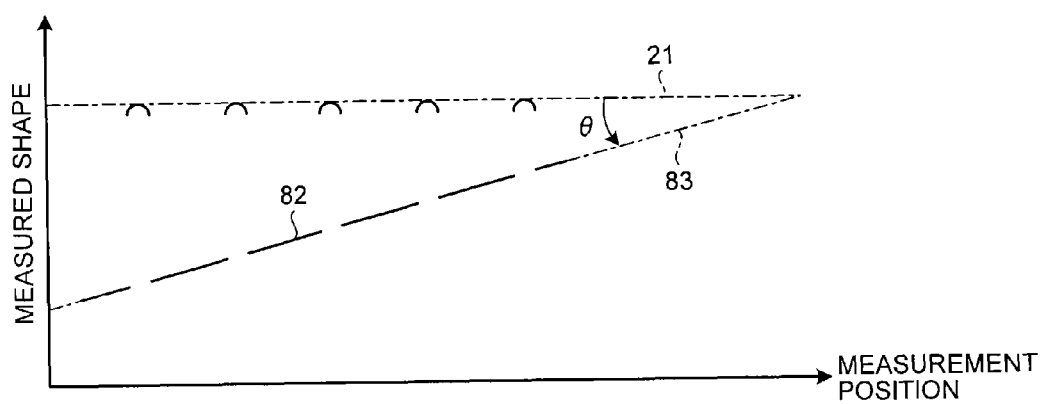
FIG. 5 is a diagram of an example of measurement data of a cutting wire part and a workpiece acquired by an angle measurement unit that is applied to the third embodiment of the present invention.

The angle measurement unit 9 can acquire measurement data 82 of the cutting wire part 2a and the end face shape of the workpiece 8, for example, as shown in FIG. 5. The angle measurement unit 9 can separate a signal acquired from the cutting wire part 2a and a signal acquired from the end face of the workpiece 8 from the measurement data 82. The angle measurement unit 9 can calculate an inclination angle of the end face 83 of the workpiece 8, an inclination angle of the plane 21 including the cutting wire part 2a (an inclination angle in the parallel direction of the cutting wire part 2*a*), and the angle θ formed between the end face 83 of the workpiece 8 and the plane 21 including the cutting wire part 2*a* on the basis of the separated signal. As the angle measurement unit 9, by using the non-contact measurement unit such as a laser displacement meter, the angle θ can be measured more exactly than by using a contact-type measurement unit.

The machining control device 50 can select a cutting wire to which a pulse voltage is applied according to the machining position, by using the inclination angle θ of the end face of the workpiece 8 with respect to the parallel direction of the cutting wire part 2*a* calculated by the angle measurement unit 9. Other configurations of the present embodiment are identical to those of the wire electric-discharge machining device 100 according to the first embodiment.

Accordingly, an operator does not need to measure the inclination angle θ of the end face of the workpiece 8 with respect to the parallel direction of the cutting wire part 2*a* in advance and input the inclination angle θ to the machining control device 50, thereby enabling the arrangements to be simplified. That is, the machining control device 50 operates according to the flowchart shown in FIG. 3 also in the present embodiment. However, at Step S5 in FIG. 3 of the present embodiment, the machining control device 50 can calculate the position of the workpiece moving stage 81 where electric discharge will occur in the remaining respective cutting wires 2*a*1 to 2*a*4, by using the calculated angle θ formed between the end face 83 of the workpiece 8 and the plane 21 including the cutting wire part 2*a* calculated by using a measurement result of the angle measurement unit 9.

In the present embodiment, for example, the angle measurement unit 9 is formed by using the non-contact measurement unit such as a laser displacement meter. However, the present embodiment is not limited thereto, and the specific method thereof is not particularly limited as long as the inclination angle of the end face of the workpiece 8 with respect to the parallel direction of the cutting wire part 2*a* is measured, and a cutting wire to which a pulse voltage is applied can be selected according to the machining position to perform machining.

Fourth Embodiment

Figure 6:
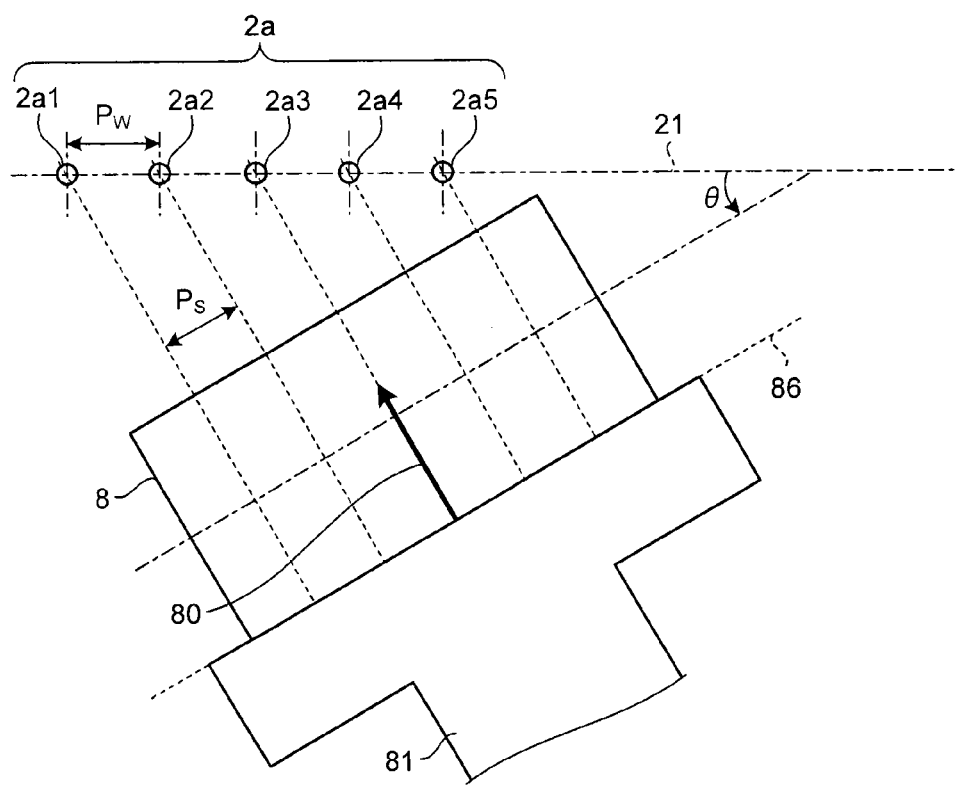
FIG. 6 is a plan view of a cutting wire part of a wire electric-discharge machining device applied to a fourth embodiment of the present invention and a workpiece as viewed from an extension direction of the cutting wire part.

FIG. 6 is a plan view of the cutting wire part 2*a* of the wire electric-discharge machining device 100 according to a fourth embodiment of the present invention and the workpiece 8 as viewed from the extension direction of the cutting wire part 2*a*. The wire electric-discharge machining device 100 according to the present embodiment drives the workpiece moving stage 81 with an inclination angle with respect to the parallel direction of the cutting wire part 2*a* to machine the workpiece 8. Specifically, as shown in FIG. 6, the workpiece moving stage 81 has two axes, that is, an axis that can drive the workpiece in the Z direction (a vertical direction to the plane of the cutting wire part 2*a*) and an axis that can drive the workpiece in the X direction (a horizontal direction to the plane of the cutting wire part 2*a*). By controlling these two axes simultaneously, the workpiece moving stage 81 is driven with the inclination angle relative to the cutting wire part 2*a*. Other configurations of the present embodiment are identical to those of the wire electric-discharge machining device 100 according to the first or second embodiment.

By driving the workpiece moving stage 81 with the inclination angle with respect to the parallel direction of the cutting wire part 2*a* in this manner, cut grooves are formed on the workpiece 8 with intervals Ps, which are narrower than a parallel interval Pw of the cutting wire part 2*a*. Also in the present embodiment, the machining control device 50 operates according to the flowchart shown in FIG. 3.

However, in the present embodiment, because the angle θ formed between the plane 21 including the cutting wire part 2*a* and the end face 83 of the workpiece 8 is known in advance by the device configuration, at Step S5 in FIG. 3, the position of the workpiece moving stage 81 where electric discharge will occur in the remaining respective cutting wires 2*a*1 to 2*a*4 can be calculated by using the angle θ. Furthermore, when the position of the workpiece moving stage 81 where electric-discharge machining is started with respect to the cutting wire 2*a*5 is known in advance, for example, when the distance between the cutting wire 2*a*5 and a portion of the end face of the workpiece 8 to be machined by the cutting wire 2*a*5 at the time of starting to drive the workpiece moving stage 81 is known in advance, Steps S2 to S4 can be omitted and selective pulse application is also possible to the cutting wire 2*a*5.

With this configuration, similarly to the second and third embodiments, a thin plate thinner than the parallel interval Pw of the cutting wire part 2*a* can be manufactured while maintaining stable electric discharge at the time of end face machining and suppressing disconnection of the wire electrode and a decrease in machining surface accuracy.

Figure 7:
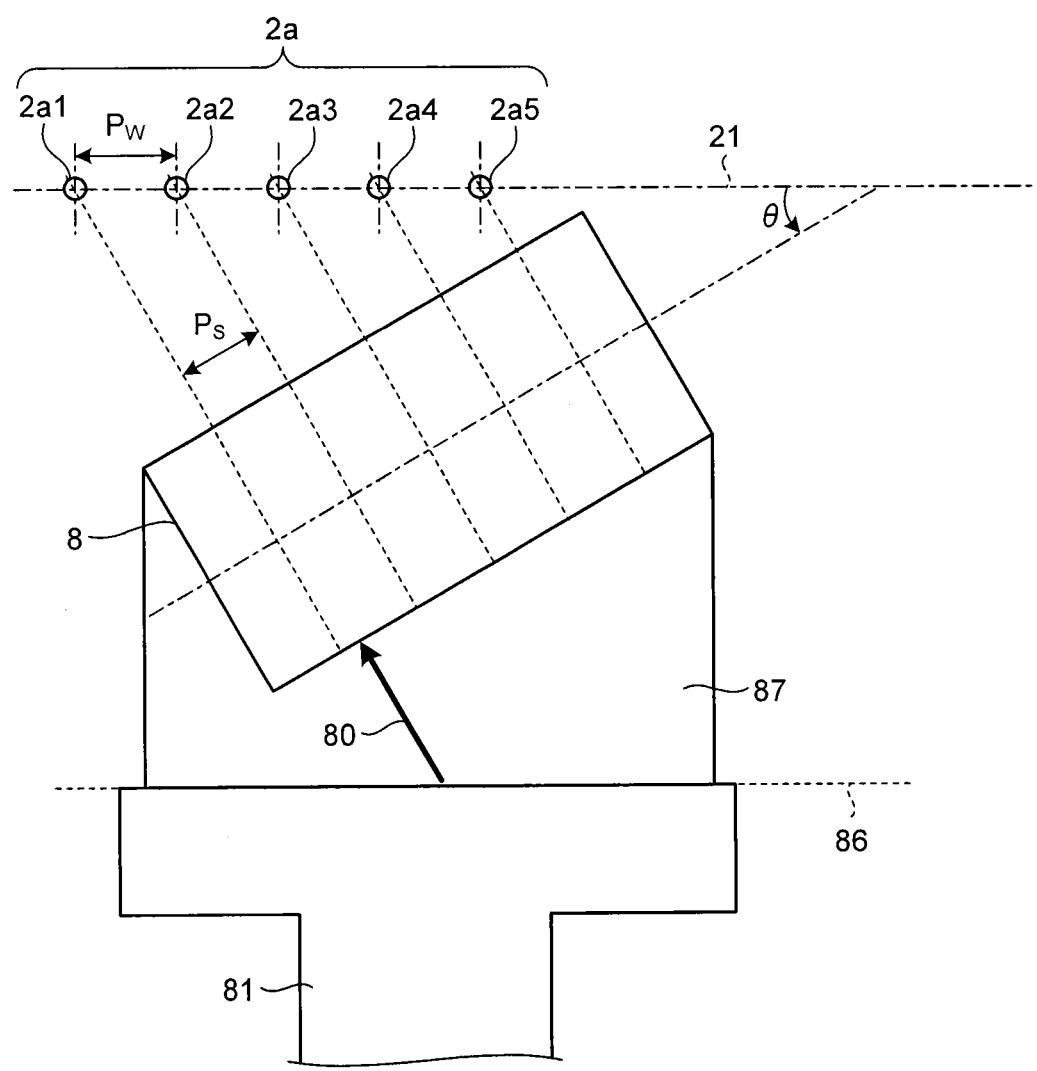
FIG. 7 is an example of a plan view of the cutting wire part of the wire electric-discharge machining device applied to the fourth embodiment of the present invention and the workpiece as viewed from the extension direction of the cutting wire part.

FIG. 6 according to the present embodiment depicts a case where the workpiece fixing surface 86 of the workpiece moving stage 81 and the plane 21 including the cutting wire part 2*a* are not parallel to each other. However, as shown in FIG. 7, the workpiece fixing surface 86 of the workpiece moving stage 81 and the plane 21 including the cutting wire part 2*a* can be parallel to each other. In this case, an adjustment is performed such that the end face of the workpiece 8 and the plane 21 including the cutting wire part 2*a* become not parallel to each other, by integrating a workpiece fixing jig 87 and the workpiece 8, or the like. That is, the unit of realizing the wire electric-discharge machining is not particularly limited as long as the wire electric-discharge machining can be advanced in a state where the moving direction 80 of the workpiece moving stage 81 and the plane 21 including the cutting wire part 2*a* are not vertical to each other.

In FIGS. 6 and 7, an example in which the moving direction 80 of the workpiece moving stage 81 is vertical to the end face of the workpiece 8 is shown. On the other hand, in the case of FIG. 2 that has been explained in the second embodiment, the moving direction 80 of the workpiece moving stage 81 is vertical to the plane 21 including the cutting wire part 2*a*. In both cases, a distance calculation for applying a pulse voltage selectively to each of the cutting wires 2*a*1 to 2*a*5 can be easily performed. However, the calculation method is not limited thereto as long as the moving direction 80 of the workpiece moving stage 81 with respect to the end face of the workpiece 8 and the plane 21 including the cutting wire part 2*a* is known. That is, by obtaining the relative distance between the workpiece 8 and the cutting wire part 2*a*, where application of the pulse voltage is supposed to be started, for each of the cutting wires 2*a*1 to 2*a*5, selective application of the pulse voltage to each cutting wire can be performed.

In the first to fourth embodiments, the respective parallel intervals between the cutting wires 2*a*1 to 2*a*5 are generally equal. However, the intervals do not need to be necessarily equal to each other. Even if the parallel intervals are not equal to each other, as long as the respective values are specifically known, the relative distance between the workpiece 8 and the cutting wire part 2*a* where application of the pulse voltage is supposed to be started can be obtained for each of the cutting wires. Accordingly, selective application of the pulse voltage can be performed.

By using the wire electric-discharge machining device 100 according to the first to fourth embodiments described above, a thin plate, particularly a thin plate of a hard-brittle material or a highly difficult-to-cut material such as a semiconductor wafer, can be cut out without being broken from the workpiece 8 such as a semiconductor ingot described above.

Furthermore, the invention of the present application is not limited to the above embodiments, and when the present invention is carried out, the invention can be variously modified without departing from the scope thereof. In the above embodiments, inventions of various stages are included, and various inventions can be extracted by appropriately combining a plurality of constituent elements disclosed herein. For example, even when some constituent elements are omitted from all constituent elements described in the embodiments, as far as the problems mentioned in the section of Solution to Problem can be solved and effects mentioned in the section of Advantageous Effects of Invention are obtained, the configuration from which some constituent elements have been omitted can be extracted as an invention. In addition, constituent elements mentioned in different embodiments can be appropriately combined.

INDUSTRIAL APPLICABILITY

As described above, the wire electric-discharge machining device, the wire electric-discharge machining method, the thin-plate manufacturing method, and the semiconductor wafer manufacturing method according to the present invention are useful for machining when an end face of a workpiece has an inclination with respect to a parallel direction of a cutting wire part, and particularly, disconnection of wires and a decrease in machining surface accuracy due to unstable electric discharge can be prevented in end face machining of a workpiece. Accordingly, the device and methods are suitable for a method of cutting out a plurality of thin plate materials collectively from a workpiece, by generating electric discharge between a cutting wire part having a plurality of cutting wires formed by winding a wire electrode around a plurality of guide rollers and the workpiece.

REFERENCE SIGNS LIST 1 wire bobbin, 2 wire electrode, 2a cutting wire part, 2a1 to 2a5 cutting wire, 2b power-feed-contact wire part, 2c wire part, 3a first guide roller, 3b second guide roller, 3c third guide roller, 3d fourth guide roller, 3e fifth guide roller, 3f sixth guide roller, 5 collecting roller, 6 machining power source, 7 power feed contact, 8 workpiece, 9 angle measurement unit, 21 plane including cutting wire parts, 50 machining control device, 61 machining power source unit, 71 power feed contact unit, 80 moving direction, 81 workpiece moving stage, 82 measurement data, 83 end face, 86 workpiece fixing surface, 87 workpiece fixing jig, 100 wire electric-discharge machining device, S1 to S8 step.

The invention claimed is:
1. A wire electric-discharge machining device comprising:
a cutting wire part including a plurality of cutting wires that are arranged parallel to each other so as to face a workpiece by winding a wire electrode around a plurality of guide rollers;
a drive unit that controls a relative distance between the workpiece and the cutting wire part;
a pulse-voltage generation unit that applies a pulse voltage between the workpiece and the cutting wires; and
an angle measurement unit that measures an inclination angle of an end face of the workpiece with respect to a plane perpendicular to a driving direction of the drive unit, wherein
the cutting wire part is arranged so as to be parallel to the plane perpendicular to the driving direction of the drive unit, and
the pulse-voltage generation unit selects a cutting wire from the plurality of cutting wires to which the pulse voltage is applied on a basis of the measured inclination angle.

2. A wire electric-discharge machining device comprising:
a cutting wire part for forming a plurality of grooves on a workpiece, the cutting wire part including a plurality of cutting wires that are arranged parallel to each other so as to face the workpiece by winding a wire electrode around a plurality of guide rollers;
a drive unit that controls a relative distance between the workpiece and the cutting wire part; and
a pulse-voltage generation unit that applies a pulse voltage between the workpiece and the cutting wires, wherein
the cutting wire part is arranged so as to be parallel to a plane having an inclination angle with respect to a plane perpendicular to a driving direction of the drive unit,
an end face of the workpiece is arranged so as to be perpendicular to the driving direction of the drive unit,
the pulse-voltage generation unit selects a cutting wire from the plurality of cutting wires to which the pulse voltage is applied on a basis of the inclination angle, and
the wire electric-discharge machining device further comprises a non-contact angle measurement unit that measures the inclination angle.

3. The wire electric-discharge machining device according to claim 2, wherein the drive unit is capable of changing the inclination angle.

4. The wire electric-discharge machining device according to claim 2, further comprising a direction setting unit capable of changing the inclination angle.

5. A method for manufacturing a thin-plate, the method comprising the steps of:
arranging a plurality of cutting wires parallel to each other by winding a wire electrode around a plurality of guide rollers so that the plurality of cutting wires face a workpiece, the plurality of cutting wires being arranged so as to be parallel to a plane perpendicular to a driving direction for the workpiece;
controlling a relative distance between the workpiece and the plurality of cutting wires with a drive unit;
measuring an inclination angle of an end face of the workpiece with respect to the plane perpendicular to the driving direction for the workpiece with an angle measurement unit;
selecting a cutting wire from the plurality of cutting wires to which a pulse voltage is applied on a basis of the measured inclination angle; and
applying the pulse voltage between the workpiece and the plurality of cutting wires.

* * * * *